(12) United States Patent
Girard et al.

(10) Patent No.: US 11,178,889 B2
(45) Date of Patent: Nov. 23, 2021

(54) VACUUM BREAKING WITHOUT FEED LINE CLOGGING

(71) Applicants: John M Girard, Downers Grove, IL (US); Sameer H Israni, Darien, IL (US)

(72) Inventors: John M Girard, Downers Grove, IL (US); Sameer H Israni, Darien, IL (US)

(73) Assignee: Praxair Technology, Inc., Danbury, CT (US)

(*) Notice: Subject to any disclaimer, the term of this patent is extended or adjusted under 35 U.S.C. 154(b) by 402 days.

(21) Appl. No.: 16/155,307

(22) Filed: Oct. 9, 2018

(65) Prior Publication Data

US 2019/0124955 A1    May 2, 2019

Related U.S. Application Data

(60) Provisional application No. 62/577,397, filed on Oct. 26, 2017.

(51) Int. Cl.
| | | |
|---|---|---|
| A23L 3/015 | (2006.01) | |
| A23B 4/005 | (2006.01) | |
| A23L 3/3418 | (2006.01) | |
| A23L 5/10 | (2016.01) | |
| A21D 8/02 | (2006.01) | |
| A23B 4/09 | (2006.01) | |

(52) U.S. Cl.
CPC ............ *A23L 3/0155* (2013.01); *A21D 8/025* (2013.01); *A23B 4/0053* (2013.01); *A23B 4/09* (2013.01); *A23L 3/3418* (2013.01); *A23L 5/17* (2016.08); *A23V 2300/38* (2013.01)

(58) Field of Classification Search
CPC ........ A23B 4/09; A23B 4/0053; A21D 8/025; A23L 3/3418; A23L 3/0155; A23L 3/001; A23L 5/17
See application file for complete search history.

(56) References Cited

U.S. PATENT DOCUMENTS

| | | | | |
|---|---|---|---|---|
| 5,120,559 | A * | 6/1992 | Rizvi | A21C 11/16 425/203 |
| 5,589,214 | A * | 12/1996 | Palm | A23B 7/00 426/506 |
| 6,026,648 | A * | 2/2000 | Cloarec | A23B 4/066 62/373 |
| 2004/0022915 | A1 * | 2/2004 | Thorson | A21D 8/025 426/549 |
| 2004/0255599 | A1 * | 12/2004 | Moller | F25D 3/10 62/64 |
| 2007/0257378 | A1 | 11/2007 | Spiegel | |
| 2008/0196416 | A1 * | 8/2008 | Girard | F25B 19/005 62/46.1 |

(Continued)

FOREIGN PATENT DOCUMENTS

| | | |
|---|---|---|
| EP | 0565651 B1 | 9/1997 |
| FR | 1315134 A | 1/1963 |

(Continued)

*Primary Examiner* — John J Norton
(74) *Attorney, Agent, or Firm* — Donald T. Black

(57) ABSTRACT

When a food processing vessel under vacuum is repressurized, the tendency of product in the vessel to be forced into feed lines is relieved or overcome by establishing an effectively high pressure in the feed lines.

16 Claims, 3 Drawing Sheets

(56) References Cited

U.S. PATENT DOCUMENTS

| | | | | |
|---|---|---|---|---|
| 2009/0121394 A1* | 5/2009 | Wagner | .................. | B29C 45/57 |
| | | | | 264/500 |
| 2012/0085425 A1* | 4/2012 | Childers | ............ | A61M 1/1688 |
| | | | | 137/14 |
| 2012/0255315 A1* | 10/2012 | Cousin | ...................... | F25D 3/10 |
| | | | | 62/64 |
| 2013/0019492 A1 | 1/2013 | Koenig et al. | | |
| 2014/0193548 A1 | 7/2014 | Godoy Varo | | |

FOREIGN PATENT DOCUMENTS

| | | |
|---|---|---|
| FR | 1399827 A | 5/1965 |
| WO | 2009/043088 A1 | 4/2009 |

* cited by examiner

VACUUM BREAKING WITHOUT FEED LINE CLOGGING

RELATED APPLICATIONS

This application claims the benefit of U.S. Provisional Application Ser. No. 62/577,397, filed on Oct. 26, 2017, which is incorporated herein by reference.

FIELD OF THE INVENTION

The present invention relates to processing of materials, such as food products, in a vessel wherein the processing includes periodically injecting gas or liquid from a feed tube into the vessel, and the processing also includes periodically subjecting the materials and/or the contents of the vessel to subatmospheric pressure in the vessel (that is, by drawing a vacuum in the vessel) followed by restoring the pressure in the vessel to atmospheric pressure or higher.

BACKGROUND OF THE INVENTION

The manufacture of products sometimes includes steps in which the product, or certain components of what will become the product, are processed in vessels such as mixers in which one or more processing steps are carried out. Such processing steps may include the mixing together of separate components or ingredients, and/or the heating or cooling of the contents of the vessel. In this context, the products being produced may be the finished article ready to be packaged and sold, or may be an intermediate composition that must still be subjected to additional processing in the vessel or elsewhere to become the finished article.

In the course of the processing in the vessel, it is often desirable to inject gas or liquid into the product that is contained in the vessel. Such injected material can comprise one or more additional ingredients to be added to the product, or can comprise liquid or gas that is fed in order to raise or lower the temperature of the product in the vessel. One particular example of this injection is the injection of cryogen, that is, a material that is normally gaseous at standard conditions of 20° C. and one atmosphere of pressure, but is injected into the vessel in the liquid state or as a mixture of its liquid and gaseous states. Injection of cryogen is intended to cool the product that is in the vessel. Other examples include the injection of water or other substances that are liquid at standard conditions, as well as injection of solutions or suspensions of desired components or reactants in a liquid carrier. The feed lines through which material is injected into the vessel usually have valving and other controls outside the vessel, upstream from the opening within the vessel through which the injected material enters the vessel.

Processing of products in a vessel can also include a step in which the pressure within the vessel is intermittently reduced to subatmospheric, and is then raised to a higher pressure which can be subatmospheric, atmospheric or higher than atmospheric pressure. When the vessel pressure is reduced to subatmospheric pressures, the feed lines can also get evacuated and reach similar subatmospheric conditions. When the pressure is increased in the vessel, the pressure in the nozzles may not increase at the same time. This can cause product present in the vessel to flow into the feed line and accumulate in the feed line. As passage through the feed line of material that is intended to be fed into the vessel does not necessarily remove the accumulated product from the feed line, the result over time can be that the interior of the feed line becomes restricted or even completely closed off. This in turn results in a lessening or even complete interruption of the desired flow of material into the vessel through the feed line, which interferes with overall operations and necessitates additional cleaning of the feed line which is expensive in time, labor and money.

BRIEF SUMMARY OF THE INVENTION

The present invention overcomes the aforementioned problems.

One aspect of the invention is a method of operating a food processing vessel, comprising (A) providing a formable food product in a food processing vessel that includes a feed line which passes from outside the vessel into the vessel and ends at an outlet opening that is exposed to formable food product in the interior of the vessel, wherein the feed line also includes a feed inlet outside the vessel for material that is liquid, gaseous, or a mixture of liquid and gaseous material, that is to flow into and through the feed line and out of the outlet opening into the vessel, wherein the interior of the vessel is at subatmospheric pressure; and then (B) increasing the pressure within the vessel to atmospheric or higher by feeding gas into space in the vessel containing the product, while maintaining the pressure in the feed line and at the outlet opening to be sufficiently high that increasing the pressure in the vessel to atmospheric pressure or higher does not cause formable product to flow in a feed line all the way up to the feed inlet.

A preferred aspect of this invention is a method of operating a food processing vessel, comprising (A) providing a formable food product in a food processing vessel that includes a feed line which passes from outside the vessel into the vessel and ends at an outlet opening that is exposed to formable food product in the interior of the vessel, wherein the feed line also includes a feed inlet outside the vessel for material that is liquid, gaseous, or a mixture of liquid and gaseous material, that is to flow into and through the feed line and out of the outlet opening into the vessel, wherein the interior of the vessel is at subatmospheric pressure; and then (B) increasing the pressure within the vessel to atmospheric or higher by feeding gas into space in the vessel containing the product, while maintaining the pressure in the feed line and at the outlet opening to be higher than the pressure in the vessel, or equal to the pressure in the vessel, or lower than the pressure in the vessel but not lower than 0.05 atmosphere below the pressure in the vessel, by feeding gas from outside the vessel into the feed line.

In one embodiment of this aspect of the invention, step (B) comprises increasing the pressure within the vessel to atmospheric by feeding gas into space in the vessel containing the product, while establishing the pressure in the feed line and at the outlet opening to be sufficiently high that increasing the pressure in the vessel to atmospheric does not cause formable product to flow into the feed line more than half of the distance from the outlet opening to the feed inlet.

In another embodiment of this aspect of the invention, step (B) comprises increasing the pressure within the vessel to atmospheric by feeding gas into space in the vessel containing the product, while establishing the pressure in the feed line and at the outlet opening to be sufficiently high that increasing the pressure in the vessel to atmospheric or higher does not cause formable product to flow into the feed line.

In one preferred practice of any and all of the foregoing embodiments and aspects of the methods of this invention, in step (A) the formable product is provided in the vessel by placing the formable product into the vessel while the interior of the vessel is at atmospheric pressure and then reducing the pressure in the vessel to subatmospheric.

In another preferred practice of any and all of the foregoing embodiments and aspects of the methods of this invention, in step (A) the formable product is provided in the vessel by establishing subatmospheric pressure in the vessel and then feeding formable product into the vessel while the pressure in the vessel is subatmospheric.

In other embodiments of the invention, in step (C) the pressure within the vessel is increased to atmospheric or higher by flowing gas into the vessel through a vent that is not the feed line; or in step (C) the pressure within the vessel is increased to atmospheric only by flowing gas into the vessel through the feed line.

By "atmospheric" pressure is meant pressure that is equal to the pressure in the local, i.e. ambient, atmosphere in the surrounding area immediately outside the vessel where the pressure is being observed. Such pressure will generally be in a range of 14.6 to 14.8 pounds per square inch, depending on prevailing atmospheric and weather conditions, on temperature, and on elevation relative to sea level.

By "subatmospheric" pressure is meant pressure that is less than "atmospheric" pressure as "atmospheric" pressure is defined herein.

The present invention is useful for processing any of a wide variety of food products, especially products that are formable. A product is considered to be formable if it is sufficiently viscous that it can maintain for at least one second any particular shape into which it has been formed (e.g. formed by hand or by mechanical equipment) and if it is also capable of being moved or reconfigured into a different shape by application of pressure to the product and, the product having been moved or reconfigured, the product then maintains that different shape for at least one second. As used herein, formable products also have to be able to be penetrated by streams of liquid directed at them or into them. Examples of formable products include ground meat (which includes mixtures of ground meat with other ingredients), and compositions (such as batters) that can be solidified in subsequent processing steps (such as baking) to create products such as baked goods, cookies, pet food kibbles, and the like.

By "food product" is meant any product that is edible by human or animal, including products to which no additional ingredients are added to create a complete edible product, and including products that are combined with other ingredients to create a complete edible product.

DETAILED DESCRIPTION OF THE INVENTION

As indicated above, the present invention is useful in processing operations in which the formable product being processed is in a vessel and is at subatmospheric pressure in the vessel at some point during the processing, following which the pressure in the vessel is increased to a higher subatmospheric, atmospheric or higher than atmospheric pressure.

One embodiment of such processing involves placing the formable food product into a food processing vessel while the interior of the vessel is at atmospheric pressure, and then reducing the pressure in the food processing vessel. This embodiment is described with reference to FIGS. 1 and 2.

The food processing with which the present invention can be practiced includes any operations in which the food product is simply held in a vessel, but preferably includes operations in which while the food product is in the vessel it is subjected to any sort of physical change including change of its composition (such as by the addition of one or more ingredients), change of its temperature by raising, lowering, or varying the temperature (whether or not the final temperature is the same or different from the starting temperature), and/or any change of the pressure to which the food product is exposed in the vessel, and/or is subjected to any sort of physical force such as by stirring, agitating, or kneading.

The food processing vessels with which the present invention can be practiced include any vessels which are suitable for carrying out the desired processing of the formable food product and which have the features which are described herein. Examples include blenders, heaters and chillers, and shredders and choppers.

Figure 1:
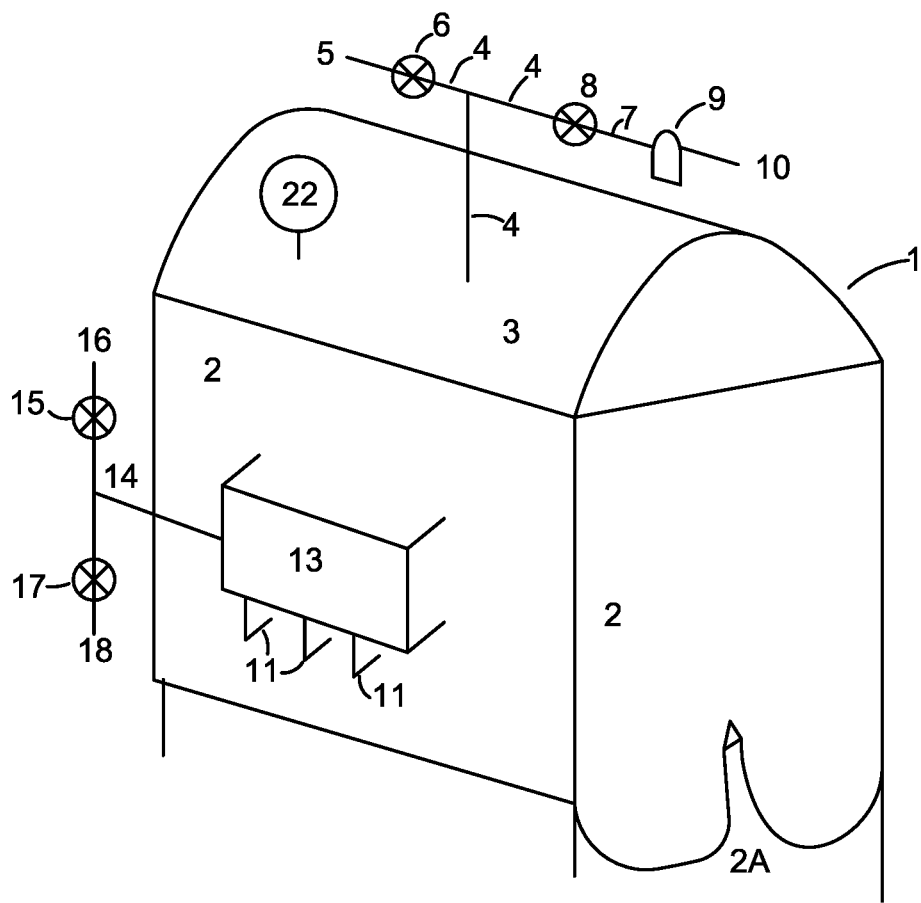
FIG. 1 is a perspective view of the exterior of an embodiment of apparatus with which the present invention can be performed.
Figure 2:
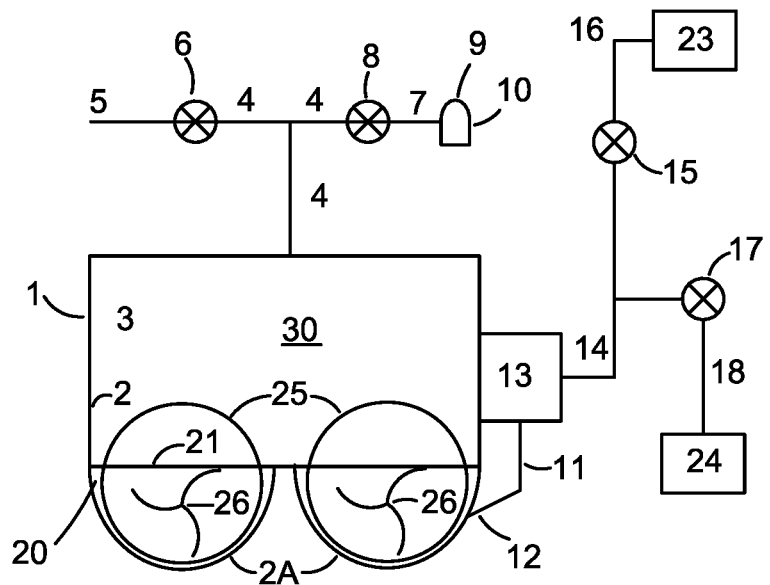
FIG. 2 is a cross-sectional schematic view of the embodiment of FIG. 1.

Referring to FIGS. 1 and 2, vessel 1 typically includes sides 2 and a bottom 2A which together form an interior space into which product 20 can be placed for processing. Vessel 1 also includes a lid 3 which has dimensions relative to the sides 2 of vessel 1 so that when lid 3 is placed over the interior space the product 20 is completely enclosed within vessel 1 and can be sealed from the external atmosphere. For convenience, lid 3 can be attached to one side 2 by hinges so that vessel 1 can be opened by swinging lid 3 up from its closed position. Optional pressure transducer or gauge 22 is provided to permit the operator to know the pressure of the gaseous atmosphere within vessel 1.

Inside vessel 1, agitating apparatus 25 is provided which moves so as to agitate and mix any product contained within vessel 1. Such apparatus typically comprises an axis extending along the length of vessel 1, arms 26 extending radially from the axis, and paddles or a helical ribbon attached to the ends of the arms 26 to engage the product as the axis rotates under the impetus of a motor or other drive (not shown) all of which are typical and well-known in this commercial arena. Typically there are one or two sets of agitating apparatus 25, with FIGS. 1 and 2 illustrating an embodiment that has two sets of agitating apparatus 25.

Hose or piping 4 is provided through which the atmosphere can be drawn from the interior of vessel 1, when it is desired to reduce the pressure within vessel 1 (when vessel 1 is closed) to less than atmospheric, and through which air can be fed into vessel 1 when it is desired to raise the pressure within vessel 1 from below atmospheric up to atmospheric. Hose 4 passes through a side 2 or lid 3 of vessel 1 so that one end of hose 4 is open to the interior of vessel 1. Hose 4 also is connected to air valve 6 and to vacuum valve 8, such as by hose 4 dividing as shown in FIGS. 1 and 2 or connected via a three-way valve. On the other side of air valve 6 from hose 4 is air line 5 which feeds air from a suitable source (e.g. room air) to air valve 6. On the other side of vacuum valve 8 from hose 4 is vacuum line 7 which is also connected to vacuum pump 9 which can be used to draw a vacuum from the interior of vessel 1.

Figure 5:
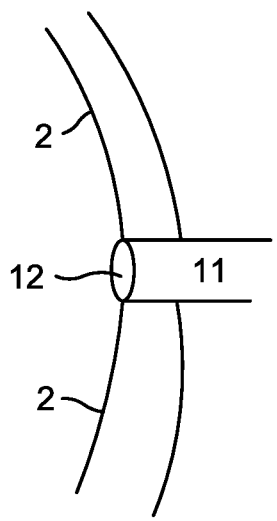
FIG. 5 is a cross-sectional view of a portion of one embodiment of apparatus with which the invention can be performed.
Figure 6:
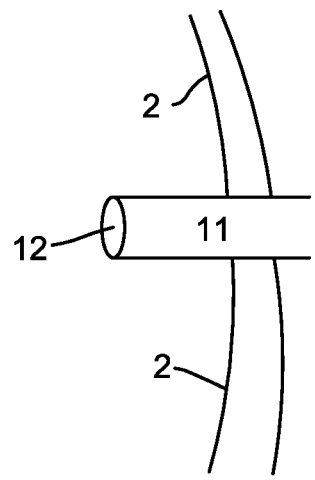
FIG. 6 is a cross-sectional view of a portion of another embodiment of apparatus with which the invention can be performed.

Feed line or feed lines 11 pass through sides 2 or through the top or the lid or the bottom of vessel 1. Each feed line 11 has an outlet opening 12 that is exposed to the interior of vessel 1. Each outlet opening 12 can be flush with the interior surface of wall 2, as shown in FIG. 5, or can be at the end of a section of line 11 that extends a short distance into vessel 1 as shown in FIG. 6. If outlet opening 12 is inward from the interior surface of vessel 1, care must be taken so that no component of apparatus 25 contacts outlet opening 12 while apparatus 25 is moving as it is being operated.

The feed lines are used to convey material into the vessel 1 that is liquid, gaseous, or is a mixture of liquid and gaseous material. Examples of gaseous material include air, as well as nitrogen, argon, carbon dioxide, mixtures thereof, and other gases and gaseous mixtures, that are at room temperature or are cold, at temperatures below 25 C to as low as −100 C. Examples of liquid material include water, solutions of additives such as flavoring agents, as well as liquefied gases such as liquid nitrogen, liquid argon, or liquid carbon dioxide. Examples of mixtures of liquid and gaseous material are mixtures of any of the foregoing gases and liquids. The description herein of the invention refers to liquid cryogens, by which is meant products which are in the liquid state but which are gaseous at conditions of atmospheric pressure and 25 C but which have been cooled to liquefy them. Liquid cryogen can be used by injecting it into food product to cool the food product during processing of the food product.

If there is more than one feed line 11, each feed line 11 can simply branch off of main line 14, or a flow distributor such as manifold 13 can be provided which is fed by main line 14 with each feed line 11 being connected to manifold 13 so that each feed line 11 then conveys its contents from manifold 13 into vessel 1. In FIGS. 1 and 2, gas valve 15 controls flow of gas into main line 14 from gas line 16 which conveys gas from a suitable source thereof shown as 23. Liquid valve 17 controls flow of liquid (such as liquid cryogen) into main line 14 from liquid line 18 which conveys liquid cryogen from a suitable source thereof shown as 24. Also, in a preferred embodiment described more fully below, lines 11 can be used to periodically feed liquid cryogen coming from source 24 into product 20 to cool the product, by periodically opening and closing valve 17 to feed the liquid cryogen into line 14 and then into each line 11. Each feed line 11 is considered to have a "feed inlet" by which is meant the first point, that is closest to the outlet opening of the feed line, at which the feed line is attached to either another line, or to a manifold or other flow distributor when such is present, or to a valve that controls the flow of gas out of a source of the gas into the feed line.

The invention is particularly useful where there is no physical structure at outlet opening 12 that can close off flow of gas through outlet opening 12 and no physical structure in feed line 11 that can close off the flow of gas in the feed line (that is, between outlet opening 12 and the valve that controls flow of gas out of the source of the gas. That is, there would be no cover (movable or otherwise) over outlet opening 12, and no valve or other flow control device in feed line 11 downstream from the valve 15 that controls flow of gas out of source 23, or no valve or other flow control device downstream of flow distributor 13.

In one stage of the operation of the apparatus that is illustrated with reference to FIGS. 1 and 2, lid 3 is raised to open vessel 1 and product 20 to be processed is placed inside vessel 1. At this stage, the interior of vessel 1 is at atmospheric pressure. As disclosed above, the product 20 is formable. If desired, other substances can be added into vessel 1 at this stage; for example, if the product 20 is ground meat, one might add seasonings or other ingredients to become part of the processed product. Preferably, a sufficient amount of the product 20 is placed in vessel 1 so that the top surface 21 of the product 20 is vertically above the location of the outlet opening 12 in the interior surface of vessel 1. Thus, in preferred operation, product 20 is either in contact with an outlet opening 12, or is sufficiently near to an outlet opening 12 such that application of pressure to top surface 21 of product 20 will push product 20 to come into contact with an outlet opening 12. The contact between product 20 and outlet opening 12 can be continuous or intermittent. In the particular case of cryogen injection through feed lines 11, if the outlet opening 20 was not in contact with the product 20, it would result in poor cryogen cooling efficiency.

Lid 3 is then closed. The product is then subjected to processing which typically includes agitation that is imparted by operation of the agitating apparatus 25. In this stage, vacuum valve 8 is closed, and air valve 6 is open keeping vessel 1 at local atmospheric conditions. It is typically not necessary to be feeding air through hose 4 into vessel 1. In this stage, the interior of vessel 1 is at atmospheric pressure.

In a subsequent stage of the operation, the pressure within vessel 1 is reduced to a value that is subatmospheric, that is, to a value of 0.01 to 0.95 atmosphere absolute (atma). Preferred values of the subatmospheric pressure at this stage are 0.05 atma to 0.33 atma, more preferably 0.1 to 0.21 atma.

This pressure reduction is achieved by ensuring that lid 3 is sealed against the top edges of sides 2 so that gas cannot pass between lid 3 and the sides 2, and air valve 6 is closed, and valves 15 and 17 are closed. If lid 3 contains an exhaust port, a lid or isolation device for the exhaust duct would also be closed in this stage. Then vacuum valve 8 is opened and vacuum pump 9 is activated to draw gas out of vessel 1, including out of space 30 that is above the top surface 21 of product 20. Withdrawn gas passes through hose 4, vacuum valve 8, vacuum line 7, vacuum pump 9 and out through exhaust line 10 which is on the downstream side of vacuum pump 9. The vacuum pump can be shut off when the desired subatmospheric pressure within vessel 1 has been attained, or the vacuum pump can be operated intermittently or even continually during this stage so as to ensure that subatmospheric pressure is present even if some air infiltrates into vessel 1 from outside vessel 1, such as through leaky seals, joints, or valves, that would cause the pressure within vessel 1 to increase undesirably.

The exposure of the product 20 to subatmospheric pressure aids in the processing of the product. The subatmospheric pressure can draw out of the product 20 off-gases or volatile components that the operator desires to remove from product 20. Also, it has been found that the subatmospheric pressure can desirably promote causing other desired substances such as flavors or preservatives that have been added into vessel 1, to permeate further into the product 20. Also, for some products, subatmospheric pressure conditions desirably alter the texture of the product such as by protein extraction. The lowest value to which the pressure in the vessel 1 is reduced, and the length of time during which the pressure is reduced from atmospheric to that lowest value, and the length of time during which the pressure remains at subatmospheric levels, are at the discretion of the operator based on experience gained by measuring the attainment of desired removal or permeation of substances in the product 20 relative to the reduced pressure value.

The pressure reduction in the vessel also reduces the pressure in each line 11 and at each outlet opening 12 to subatmospheric pressure. The pressure in line 11 and outlet opening 12 will often be equal to the reduced pressure in the space 30 above surface 21. However, if the product 20 is dense or viscous or where the product 20 is in contact with an outlet opening 12, the pressure at an outlet opening 12 may be higher than the pressure above surface 21 while still being subatmospheric.

When a sufficient quantity of product 20 is present in vessel 1, and the pressure in vessel 1 has reached a desired subatmospheric value, by practicing this embodiment, the next steps can then be performed as described further below.

Figure 3:
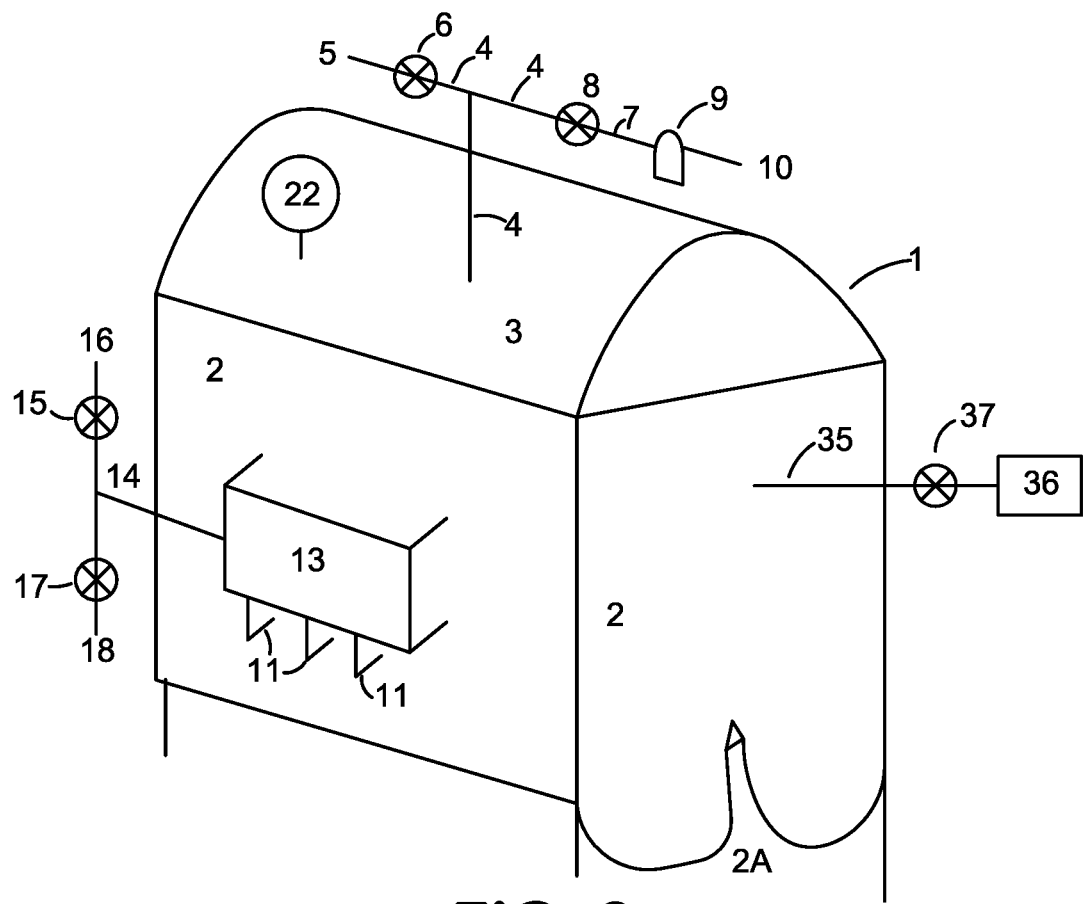
FIG. 3 is a perspective view of the exterior of another embodiment of apparatus with which the present invention can be performed.
Figure 4:
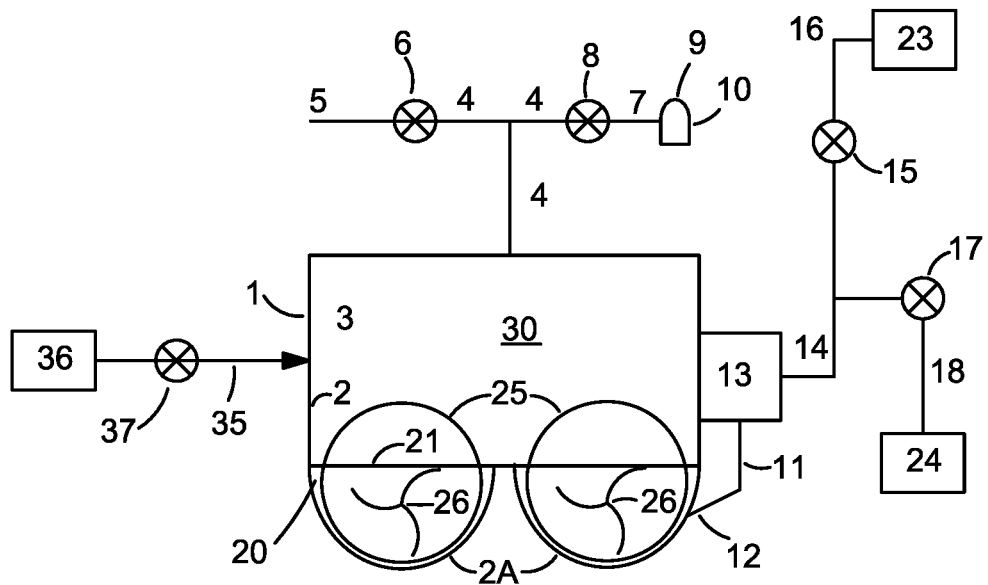
FIG. 4 is a cross-sectional schematic view of the embodiment of FIG. 3.

A second embodiment by which product can be provided in the vessel at subatmospheric pressure is now described here, with reference to FIGS. 3 and 4. Reference numerals that appear in FIGS. 3-4 which also appear in FIGS. 1-2 have the meanings provided herein with respect to FIGS. 1-2. In this embodiment, the interior of vessel 1 is already at subatmospheric pressure before product is fed into vessel 1. The pressure within vessel 1 is reduced to a value that is subatmospheric, that is, to a value of 0.01 to 0.95 atma. Preferred values of the subatmospheric pressure at this stage are 0.05 atma to 0.33 atma, more preferably 0.1 to 0.21 atma.

The subatmospheric pressure is established by use of vacuum pump 9 as described above, with valve 6 closed and valve 8 open. Valves 15 and 17 are closed. If there is a lid 3 that can be moved between open and closed positions, then it should be closed in this embodiment before the reduction of pressure from atmospheric to subatmospheric begins. The interior of vessel 1 may have been at atmospheric pressure at the end of a previous cycle, such as by opening of lid 3 to remove product 20 that has been processed in a previous cycle. Then the interior of vessel 1 is brought to subatmospheric pressure.

When the pressure in the interior of vessel 1 has been reduced to the desired subatmospheric value, or even while the pressure in the interior of vessel 1 is still being reduced to a desired subatmospheric value, product 20 is fed into vessel 1 by feeding it from source 36 through line 35 which penetrates through a side 2 of vessel 1 and which ends at an open end inside vessel 1. Passage of product 20 through line 35 is preferably controlled by valve 37. The flow of product 20 through line 35 can be aided by physically forcing the product through line 35, or by applying to the upstream side of the product a degree of pressure that exceeds the subatmospheric pressure inside vessel 1 so that the pressure differential drives flow of the product into vessel 1 or draws the product into vessel 1. The product 20 in vessel 1 can then be processed if desired such as by adding other additives and/or by agitating it with agitating apparatus 25, all as described above.

When a sufficient quantity of product 20 is present in vessel 1, and the pressure in vessel 1 has reached a desired subatmospheric value, by practicing this second embodiment, the next steps can then be performed as are now described.

When the pressure in the feed lines 11 and the outlet openings 12 is greater than or equal to the pressure in the vessel, or is lower than the pressure in the vessel but not more than 0.05 atmosphere lower than the pressure in the vessel, for example by feeding of gas into feed line 11 and outlet opening 12 as described above, the vessel 1 is repressurized, by which is meant that repressurizing gas (air, or other gas, or a mixture of gasses) is permitted to enter into vessel 1 to raise the pressure within vessel 1 from subatmospheric to local atmospheric condition or higher than atmospheric. This repressurization is typically carried out by feeding the repressurizing gas into vessel 1 through a line other than feed line(s) 11. For instance, repressurizing gas can be fed by closing vacuum valve 8 if it was not already closed, and opening air valve 6 to permit air to flow from air line 5 through air valve 6 into hose 4 and into vessel 1. Alternatively, this repressurization can be carried out by keeping valves 6 and 8 closed, and passing air or other gas or gasses through valve 15 into lines 11 and through outlet openings 12 into vessel 1. In this step, "gas" can be a single gas substance such as gaseous nitrogen or carbon dioxide, or can be a mixture of gases, such as air.

At the start of the repressurization of vessel 1, the pressure in each line 11 at each outlet opening 12 should be equal to, or higher than, the pressure in the space 30 above surface 21 of product 20 in vessel 1. However, the pressure in each line 11 at each outlet opening 12 can be lower than the pressure in vessel 1, but not lower than 0.05 atmosphere less than the pressure in the atmosphere in vessel 1.

In the next steps, while the pressure of the gaseous atmosphere in vessel 1 is still subatmospheric (such as at the beginning of the re-pressurization step), the desired pressure as indicated herein in lines 11 and at outlet openings 12 can be established by passing gas from outside vessel 1 into vessel 1 through feed line 11, preferably through every feed line 11 that is present. This can be achieved by keeping liquid valve 17 closed, and opening gas valve 15, and feeding gas from a source 23 of the gas into and through gas line 16 so that the gas passes through main line 14 and into each feed line 11. Air valve 6 remains closed, and vacuum valve 8 is preferably closed but may be open to continue to draw gas out of vessel 1 through vacuum pump 9. In other embodiments, this gas can be fed into a line upstream of the manifold 13 (as shown), or it can be fed into the manifold 13, or it can be fed into the lines 11 between manifold 13 and vessel 1. In this step, "gas" can be a single gas substance such as gaseous nitrogen or carbon dioxide, or can be a mixture of gases, such as air.

Throughout all of the repressurization, until the pressure in the vessel reaches local atmospheric condition (or higher), the pressure in lines 11 and at outlet openings 12 should be maintained at values which are high enough to limit or even (preferably) prevent the forcing of product 20 into outlet openings 12 and feed lines 11 by virtue of the pressure in the space 30. Preferably, the pressure at outlet openings 12 and in lines 11 should be equal to or greater than the pressure in space 30, even as the pressure in space 30 increases toward atmospheric pressure. However, some passage of product 20 into lines 11 can be tolerated, so long as product does not extend so far into a line 11 that the product reaches all the way to a "feed inlet" as defined above. If product flows into a feed line, it is more preferred that the product does not flow more than half of the distance from the feed line's outlet opening to its feed inlet.

This result can be achieved by providing that throughout the repressurizing step, the pressure at each outlet opening 12 and in each feed line 11 is greater than or equal to the pressure in the vessel 1, or is lower than the pressure in vessel 1 but not lower than 0.05 atmosphere below (more preferably, 0.007 atmosphere below) the pressure in the space 30 above surface 21 of the product 20. As indicated above, it is more preferred that the pressure in the feed line and at the outlet opening is equal to or greater than the pressure in the space above surface 21 in vessel 1. It will be recognized that as the pressure in the space 30 increases toward atmospheric, the lower limit of the permissible pressure in the feed line 11 and at the outlet opening 12 will also increase, whether that lower limit is practiced as 0.05 atmosphere less than the pressure in space 30, or as 0.007 atmosphere less than the pressure in space 30, or is equal to or greater than the pressure in space 30. This pressure condition at the outlet opening 12 and in lines 11 can be maintained at values that satisfy this condition relative to the pressure in space 30 by feeding additional gas as necessary from source 23 into line 11 to outlet opening 12.

This has a valuable result that product 20 is not forced into the outlet openings 12, and upwards into lines 11 an excessive distance, by excessive pressure in vessel 1 on product 20 relative to the pressure in outlet opening 12 and lines 11. Preferably, product 20 does not plug the lines 11 at all, or at least if product 20 is in line 11 it has not progressed so far as to require excessively burdensome cleaning steps as would be the case if product 20 reached all the way into manifold 13 or to a valve or to a junction with another feed line.

When the pressure in vessel 1 has reached local atmospheric pressure, the flow of gas through lines 11 into vessel 1 can be discontinued. Alternately, the flow of gas can be terminated when the pressure in vessel 1 reaches 0.05 atmosphere below local atmospheric pressure.

As mentioned above, liquid cryogen or other substances can be fed into product 20 through lines 11. This is often performed after the pressure in vessel 1 has been restored to 1 atmosphere following the stage in which the pressure in vessel 1 was reduced to subatmospheric.

During any introduction of liquid cryogen and/or other substances into the product 20 through lines 11, the product 20 can be agitated by apparatus 25 and subjected to any other desired processing in vessel 1, as desired by the operator.

Then the product 20, having been processed, including the addition of any substances as described herein, is removed from vessel 1, typically by opening lid 3 and physically taking the product 20 out of vessel 1 or using discharge door(s) if present on vessel 1. Following any desired cleaning or other treatment of the interior of vessel 1, the foregoing sequence of steps can be repeated beginning with a fresh amount of product 20 being placed into vessel 1.

There are several alternative modes of carrying out the foregoing stages, and for controlling when each stage would begin and end.

For instance, the passage of gas from outside vessel 1 to establish the pressure in feed lines 11 and at outlet openings 12 to be greater than or equal to the pressure in the vessel 1, or lower than the pressure in vessel 1 but not lower than 0.05 atmosphere below the vessel pressure, can be initiated as soon as the vacuum pump is turned off, thereby ending the step of reducing the pressure in the vessel to subatmospheric, or a period of time (expressed as W seconds) after the vacuum pump is turned off, or even a number of seconds (expressed as X seconds) before the vacuum pump is turned off.

Alternatively, the passage of gas into lines 11 and outlet openings 12 can be initiated on the basis of the pressure as measured in the space above product 20, or the pressure as measured at the outlet openings 12 (or as measured in lines 11 or as measured in manifold 13), or the difference between these two pressures, in that when the pressure in vessel 1 begins to increase then it is important for the pressure in the feed lines 11 and outlet openings 12 to be sufficiently high to resist flow of product 20 into the outlet openings 12 and lines 11, or a combination of any of the foregoing.

The passage of gas from outside vessel 1 to establish the pressure in feed lines 11 and at outlet openings 12 can be discontinued on the basis of the passage of a set length of time, or when the pressure in the manifold 13, or in line 11, or in the space 30 above product 20, reaches a particular value (it being recognized that each of said values would be different from each other), or on the basis of the difference between the pressure in vessel 1 and the pressure at outlet openings 12 reaching a particular value, or a combination of the foregoing.

The particular values of processing times, pressures, and pressure differences, that will be effective in the operation of a particular vessel and processing operation with a particular identity of product 20, can be determined by carrying out these stages in actual operation and then determining the conditions and parameters that provide the desired result of limiting or eliminating the passage of product 20 into the lines 11. The invention can in this manner be carried out as a batch operation or in continuous manner.

What is claimed is:

1. A method of operating a food processing vessel, comprising
    (A) providing a formable food product in a food processing vessel that includes a feed line which passes from outside the vessel into the vessel and ends at an outlet opening that is exposed to the formable food product in the interior of the vessel, wherein the feed line also includes a feed inlet outside the vessel for material that is liquid, gaseous, or a mixture of liquid and gaseous material, that is to flow into and through the feed line and out of the outlet opening into the vessel,
    feeding material that is liquid, gaseous, or a mixture of liquid and gaseous material, into and through the feed line and out of the outlet opening into the vessel,
    wherein the interior of the vessel is at subatmospheric pressure; and then
    (B) increasing the pressure within the vessel to atmospheric or higher pressure by feeding gas into space in the vessel containing the formable food product, while maintaining the pressure in the feed line and at the outlet opening to be sufficiently high that increasing the pressure in the vessel to atmospheric pressure or higher does not cause the formable food product to flow in the feed line from the outlet opening all the way up to the feed inlet.

2. The method according to claim 1 wherein in step (A) the formable food product is provided in the vessel by placing the formable food product into the vessel while the interior of the vessel is at atmospheric pressure and then reducing the pressure in the vessel to subatmospheric.

3. The method according to claim 1 wherein in step (A) the formable food product is provided in the vessel by establishing subatmospheric pressure in the vessel and then feeding the formable food product into the vessel while the pressure in the vessel is subatmospheric.

4. The method according to claim 1 wherein step (B) comprises increasing the pressure within the vessel to atmospheric by feeding gas into the space in the vessel containing the product, while establishing the pressure in the feed line and at the outlet opening to be sufficiently high that increasing the pressure in the vessel to atmospheric does not cause the formable food product to flow into the feed line more than half of the distance from the outlet opening to the feed inlet.

5. The method according to claim 1 wherein step (B) comprises increasing the pressure within the vessel to atmospheric by feeding gas into the space in the vessel containing the product, while establishing the pressure in the feed line and at the outlet opening to be sufficiently high that increasing the pressure in the vessel to atmospheric does not cause the formable food product to flow into the feed line.

6. The method of claim 1 wherein in step (B) the pressure within the vessel is increased to atmospheric by flowing gas into the vessel through a vent that is not the feed line.

7. The method of claim 1 wherein in step (B) the pressure within the vessel is increased to atmospheric only by flowing gas into the vessel through the feed line.

8. The method according to claim 1 wherein there is no physical structure at said outlet opening that can close off flow of liquid or gaseous material through said outlet opening and no physical structure in said feed line that can close off the flow of liquid or gaseous material in said feed line.

9. A method of operating a food processing vessel, comprising
(A) providing a formable food product in a food processing vessel that includes a feed line which passes from outside the vessel into the vessel and ends at an outlet opening that is exposed to the formable food product in the interior of the vessel, wherein the feed line also includes a feed inlet outside the vessel for material that is liquid, gaseous, or a mixture of liquid and gaseous material, that is to flow into and through the feed line and out of the outlet opening into the vessel,
feeding material that is liquid, gaseous, or a mixture of liquid and gaseous material, into and through the feed line and out of the outlet opening into the vessel,
wherein the interior of the vessel is at subatmospheric pressure; and then
(B) increasing the pressure within the vessel to atmospheric or higher by feeding gas into space in the vessel containing the formable food product, while maintaining the pressure in the feed line and at the outlet opening to be higher than the pressure in the vessel, or equal to the pressure in the vessel, or lower than the pressure in the vessel but not lower than 0.05 atmosphere below the pressure in the vessel, by feeding gas from outside the vessel into the feed line.

10. The method according to claim 9 wherein in step (A) the formable food product is provided in the vessel by placing the formable food product into the vessel while the interior of the vessel is at atmospheric pressure and then reducing the pressure in the vessel to subatmospheric.

11. The method according to claim 9 wherein in step (A) the formable food product is provided in the vessel by establishing subatmospheric pressure in the vessel and then feeding the formable food product into the vessel while the pressure in the vessel is subatmospheric.

12. The method according to claim 9 wherein step (B) comprises increasing the pressure within the vessel to atmospheric by feeding gas into the space in the vessel containing the formable food product, while establishing the pressure in the feed line and at the outlet opening to be sufficiently high that increasing the pressure in the vessel to atmospheric does not cause the formable food product to flow into the feed line more than half of the distance from the outlet opening to the feed inlet.

13. The method according to claim 9 wherein step (B) comprises increasing the pressure within the vessel to atmospheric by feeding gas into the space in the vessel containing the formable food product, while establishing the pressure in the feed line and at the outlet opening to be sufficiently high that increasing the pressure in the vessel to atmospheric does not cause the formable food product to flow into the feed line.

14. The method of claim 9 wherein in step (B) the pressure within the vessel is increased to atmospheric by flowing gas into the vessel through a vent that is not the feed line.

15. The method of claim 9 wherein in step (B) the pressure within the vessel is increased to atmospheric only by flowing gas into the vessel through the feed line.

16. The method according to claim 9 wherein there is no physical structure at said outlet opening that can close off flow of liquid or gaseous material through said outlet opening and no physical structure in said feed line that can close off the flow of liquid or gaseous material in said feed line.

* * * * *